United States Patent
Mathuria et al.

(10) Patent No.: US 12,305,527 B1
(45) Date of Patent: May 20, 2025

(54) METHOD AND SYSTEM FOR APPLYING PRE-STRETCH TO SHAFT AND COMPONENT CONNECTION

(71) Applicant: RTX CORPORATION, Farmington, CT (US)

(72) Inventors: Parag H. Mathuria, Palm Beach Gardens, FL (US); Joshua Robert Seyler, Stuart, FL (US); John A. Bellavia, Port St. Lucie, FL (US); Lajos H Horvath, Jupiter, FL (US); Kevin Pripusich, Palm City, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/510,833

(22) Filed: Nov. 16, 2023

(51) Int. Cl.
  *F01D 5/02* (2006.01)
  *F01D 25/28* (2006.01)

(52) U.S. Cl.
  CPC ........... *F01D 5/025* (2013.01); *F01D 25/285* (2013.01); *F05D 2220/30* (2013.01); *F05D 2230/60* (2013.01); *F05D 2240/24* (2013.01); *F05D 2240/55* (2013.01); *F16C 2229/00* (2013.01)

(58) Field of Classification Search
  CPC ............. F05D 2230/60; F05D 2220/30; F16C 2226/60; F16C 2229/00; F01D 5/025
  See application file for complete search history.

(56) References Cited

U.S. PATENT DOCUMENTS 8,683,670 B2    4/2014   Thomas

FOREIGN PATENT DOCUMENTS

| CN | 101701588 A | 5/2010 |
|----|-------------|--------|
| CN | 113340506 A | 9/2021 |
| CN | 114033553 A | 2/2022 |

OTHER PUBLICATIONS

Machine Translation of CN 101701588 A (Year: 2010).*

* cited by examiner

*Primary Examiner* — Christopher J. Besler
(74) *Attorney, Agent, or Firm* — Carlson, Gaskey & Olds, P.C.

(57) ABSTRACT

A method of securing two components under this disclosure could be said to include receiving an input including a commanded pressure for achieving a pre-stretch on a shaft housed within a fixture. The shaft is coupled to a first component and extending through a second component. In response to receiving the input, causing hydraulic fluid to be provided to the fixture at a pressure based on the commanded pressure, to initiate the pre-stretch on the shaft. A measured stretch of the shaft is received from a sensor. Determining if the measured stretch is within a range of acceptable stretch; and based on a determination that the measured stretch is within the range of acceptable stretch, causing an indication of acceptability. The indication of acceptability being an instruction to tighten a nut to secure the shaft to the second component. A system and a controller are also disclosed.

9 Claims, 4 Drawing Sheets

METHOD AND SYSTEM FOR APPLYING PRE-STRETCH TO SHAFT AND COMPONENT CONNECTION

BACKGROUND OF THE INVENTION

This application relates to a method and system for pre-stretching a shaft being connected to a part.

Turbine components have a number of distinct configurations. In one component a turbine rotor is connected to a compressor rotor. One of the two rotors has a shaft. A nut is tightened on the shaft to secure the two rotors together.

In one known method of attaching the two rotors together, the shaft is pre-stretched prior to the nut being tightened. In the prior art there has been a manually operated system for supplying hydraulic pressure to a fixture to stretch the shaft. Due to the manual control, this system is not optimal.

Moreover, due to the manual control, an operator must be engaged with controlling the pressure, rather than focusing on monitoring the overall status of the parts within the toolset as they are loaded up hydraulically, as well as the screen status of the hydraulic loading.

SUMMARY OF THE INVENTION

In a featured embodiment, a method of securing two components includes receiving an input including a commanded pressure for achieving a pre-stretch on a shaft housed within a fixture. The shaft is coupled to a first component and extending through a second component. In response to receiving the input, causing hydraulic fluid to be provided to the fixture at a pressure based on the commanded pressure, to initiate the pre-stretch on the shaft. A measured stretch of the shaft is received from a sensor. Determining if the measured stretch is within a range of acceptable stretch; and based on a determination that the measured stretch is within the range of acceptable stretch, causing an indication of acceptability. The indication of acceptability being an instruction to tighten a nut to secure the shaft to the second component.

In another embodiment according to the previous embodiment, at least a valve is controlled to achieve the pressure being sent to the fixture.

In another embodiment according to any of the previous embodiments, the pressure includes a pressurization schedule in which the pressure increases towards the commanded pressure initially at a first slow rate, then at an increased rate, then returned to a second slow rate as the commanded pressure is approached.

In another embodiment according to any of the previous embodiments, a first indicator of a first light color is illuminated during pressurization when the pressure is less than the commanded pressure, and a second indicator of a second light color is illuminated at the commanded pressure.

In another embodiment according to any of the previous embodiments, if a determination is made that the measured stretch is not within the range of acceptable stretch, then there is an indication that the part is not acceptable.

In another embodiment according to any of the previous embodiments, one of the first component and the second component is a turbine rotor and the other is a compressor rotor.

In another embodiment according to any of the previous embodiments, the measured stretch is determined and compared to the range of acceptable stretch by calculating a modulus of elasticity of the shaft.

In another embodiment according to any of the previous embodiments, the hydraulic fluid is supplied to a hydraulic ram in the fixture driving a shaft puller, which is also part of the fixture and which is secured to the shaft such that it stretches the shaft.

In another featured embodiment, a system for securing a first component and shaft to a second component includes a fixture for mounting the first component and the second component. A hydraulic pump is configured to pump hydraulic fluid through a valve. A controller includes a processing circuitry and a memory storing instructions that, when executed, cause the processing circuitry to receive, via a user interface, a commanded hydraulic pressure for stretching the shaft. The controller determines, based at least in part on the commanded hydraulic pressure, a pressurization schedule for stretching the shaft, wherein the pressurization schedule comprises a plurality of pressures of the hydraulic fluid that increase to the commanded hydraulic pressure. The processing circuitry causes the hydraulic pump and valve to operate such that the hydraulic fluid is pumped through the system based on the pressurization schedule.

In another embodiment according to any of the previous embodiments, the controller is further configured to determine, based on sensor data received from a sensor, a measured stretch of the shaft, compare the measured stretch of the shaft to a range of acceptable stretch, and determine that the shaft is a failed part based on a determination that the measured stretch of the shaft is outside the range of acceptable stretch.

In another embodiment according to any of the previous embodiments, the sensor includes a transducer and the range of acceptable stretch is based on a modulus of the elasticity of the shaft.

In another embodiment according to any of the previous embodiments, both the hydraulic pump and the valve are controlled to achieve the commanded pressure being sent to the fixture.

In another embodiment according to any of the previous embodiments, the controller further configured to cause a first indicator to illuminate on the user interface based on a determination that a pressure of the plurality of pressures is less than the commanded pressure, and cause a second indicator to illuminate on the user interface based on a determination that the pressure of the plurality of pressures is equal to the commanded pressure.

In another embodiment according to any of the previous embodiments, the controller is further configured to receive, via the user interface, an input comprising a completion signal, determining a second pressurization schedule comprising a second plurality of pressures of the hydraulic fluid that decreases toward a zero pressure, and causing the hydraulic pump and valve to operate based on the second pressurization schedule.

In another embodiment according to any of the previous embodiments, the first pressurization schedule comprises the plurality of pressures of the hydraulic fluid increasing initially at a first slow rate, then at an increased rate, then returned to a second slow rate as the commanded pressure is approached.

In another embodiment according to any of the previous embodiments, further including a hydraulic ram configured to drive a shaft puller which is secured to the shaft such that it stretches the shaft, the hydraulic fluid is supplied to the hydraulic ram for stretching the shaft.

In another featured embodiment, a controller includes a controller including a processor and a memory storing instructions that, when executed, cause the processor to receive, via a user interface, a commanded hydraulic pressure for stretching a shaft, and determine, based at least in part on the commanded hydraulic pressure, a pressurization schedule for stretching the shaft. The pressurization schedule comprises a plurality of pressures of the hydraulic fluid that increase to the commanded hydraulic pressure. The controller causes the hydraulic pump and valve to operate such that the hydraulic fluid is pumped through the system based on the pressurization schedule.

In another embodiment according to any of the previous embodiments, the controller is further configured to cause a first indicator to illuminate on the user interface based on a determination that a pressure of the plurality of pressures is less than the commanded pressure and cause a second indicator to illuminate on the user interface based on a determination that the pressure of the plurality of pressures is equal to the commanded pressure In another embodiment according to any of the previous embodiments, the controller is further configured to determine, based on sensor data received from a sensor, a measured stretch of the shaft, and compare the measured stretch of the shaft to a range of acceptable stretch; and determine that the shaft is a failed part based on a determination that the measured stretch of the shaft is outside the range of acceptable stretch.

In another embodiment according to any of the previous embodiments, the operator is also provided with feedback if the measured stretch is within the range of acceptable stretch.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1A:
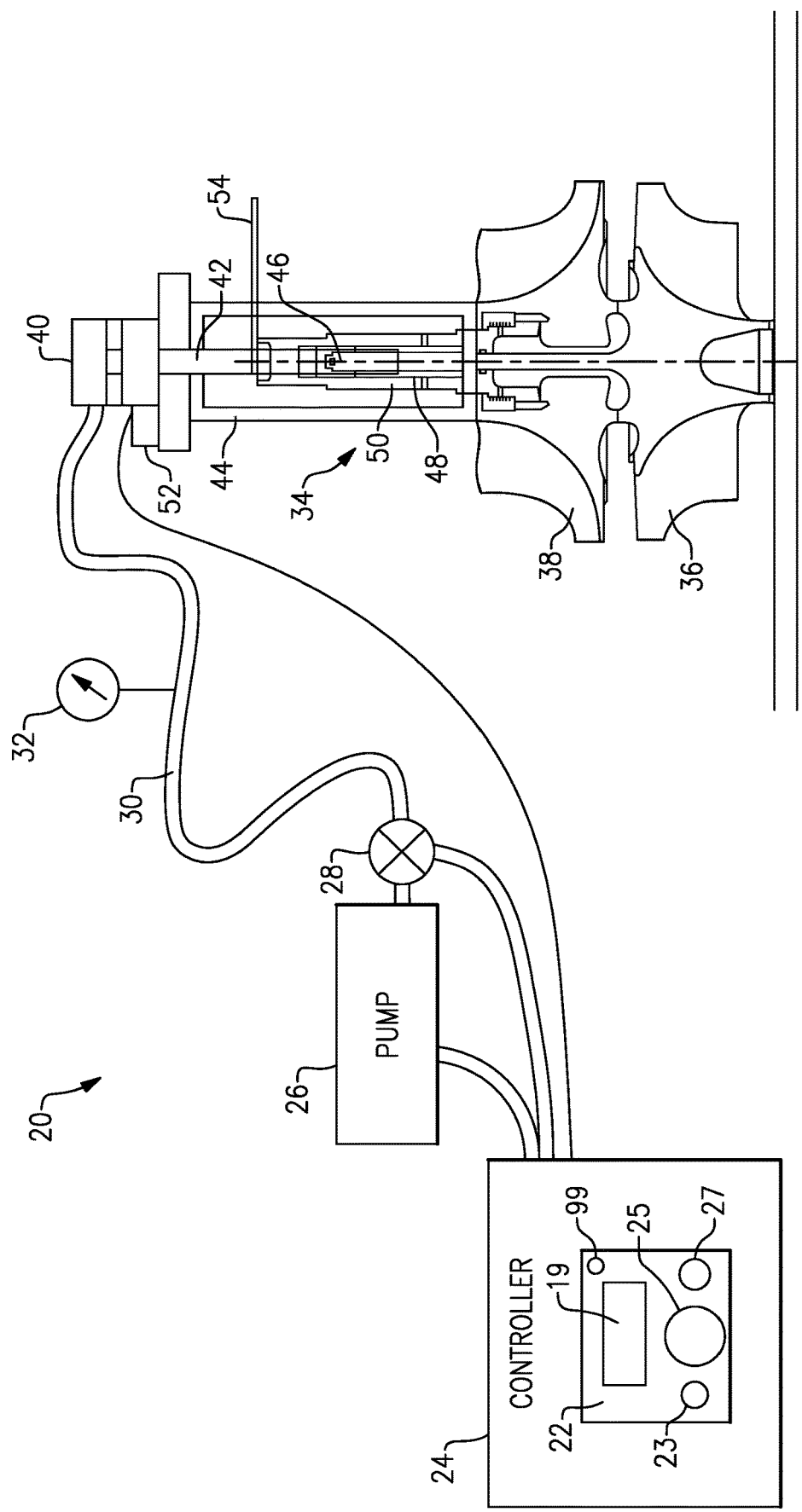
FIG. 1A shows an assembly for pre-stretching a shaft.

Assembly 20 is shown in FIG. 1A for applying hydraulic pressure to a fixture 34 to pre-stretch a shaft 46 prior to it being secured to a rotor. A user interface 22, which may be a graphical user interface ("GUI"), allows for commanding a pressure of the fluid delivered into a hydraulic line 30 through controller 24. There is a visual pressure gauge 32 associated with the hydraulic line 30.

The hydraulic line 30 communicates with the fixture 34. The fixture 34 is shown receiving a turbine rotor 36 having a shaft 46 and a compressor rotor 38. The fixture 34 is intended to pre-stretch the shaft 46 prior to a nut 48 being tightened to secure the shaft 46 and rotor 36 to rotor 38. An outer shaft 50 surrounds shaft 46 and nut 48.

While a compressor rotor is disclosed being secured to a turbine rotor, other components being secured can benefit from the teaching of this disclosure.

The fixture 44 includes a shaft puller 42 that is pulled upwardly by hydraulic ram 40 receiving the hydraulic fluid from line 30. A transducer 52 can sense the amount of movement occurring when the pre-stretching is applied. In one embodiment a LVDT transducer is used. Transducer 52 may sense the movement of the shaft or the movement of the shaft puller 42.

An operator selects a particular assembly to be pre-stretched from a list of options on a visual display 19 on the user interface 22.

The operator will then send a command to controller 24 to command a particular pre-stretch pressure to be delivered to the hydraulic ram 40. As the controller begins to control the pump 26 and valve 28 to provide that pressurized fluid, a first light 23 illuminates (e.g., a first indicator is displayed).

As will be disclosed below, the controller ramps the pressure toward a commanded pressure, initially beginning with a slow ramp, then increasing the speed of the ramp, and then decreasing the speed of the ramp over time as it approaches the commanded pressure.

Once the commanded pressure is reached, the first light 23 will go off and a second light 27 will come on (e.g., a second indicator is displayed). Lights 23 and 27 may be different colors. A kill switch 25 is also provided on user interface 22.

The operator then knows it is appropriate to tighten the nut 48. A wrench 54 is shown schematically to tighten the nut.

Figure 1B:
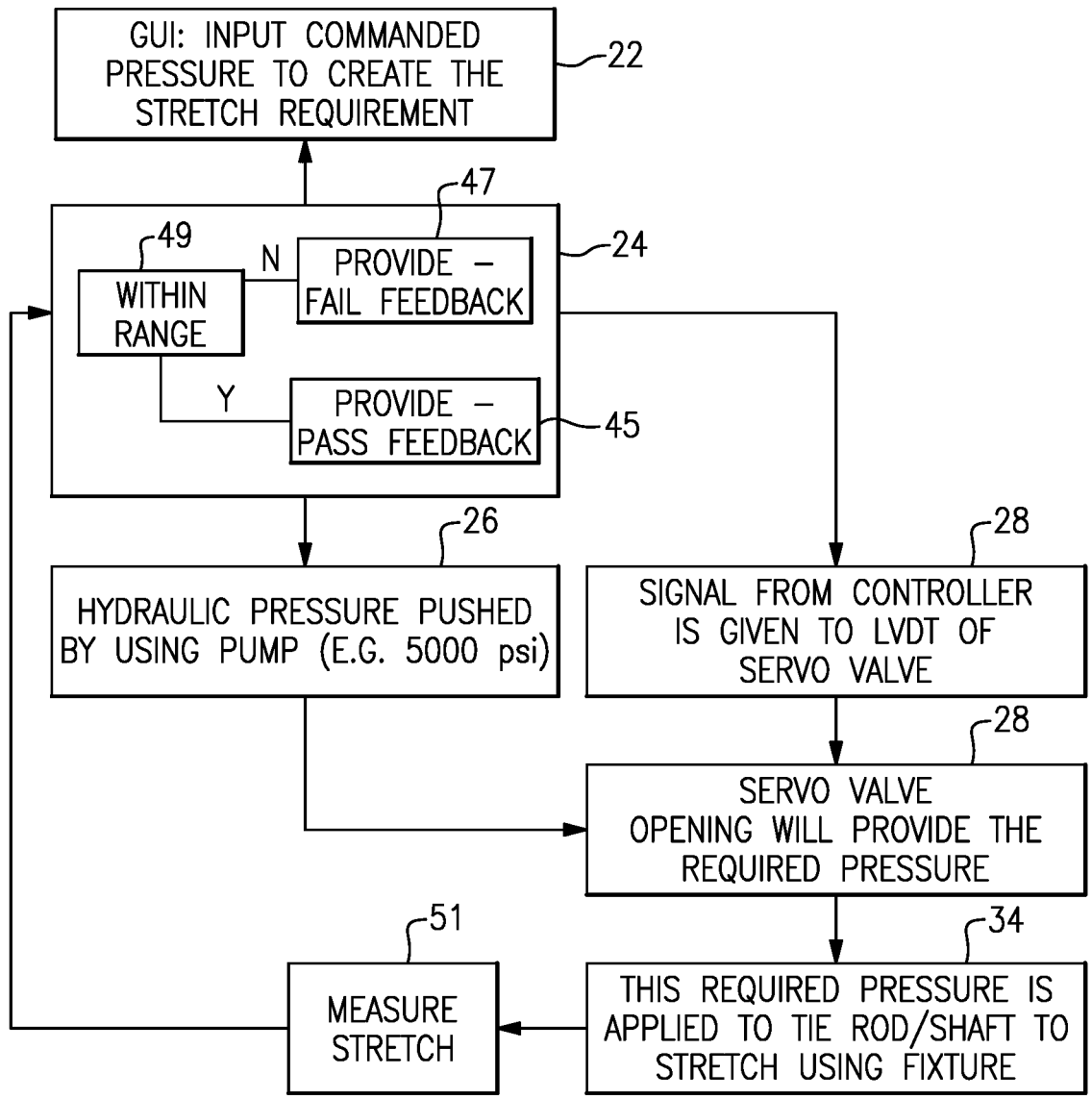
FIG. 1B schematically shows operation of the FIG. 1A assembly.

FIG. 1B is a schematic of the operation disclosed herein. The user interface 22 inputs the commanded pressure. The controller 24 controls the hydraulic pressure provided by pump 26, and controls the servo valve 28 to provide the commanded pressure to the ram 40. The pressure is applied to the shaft 46 to stretch the shaft using the fixture 34.

Figure 2:
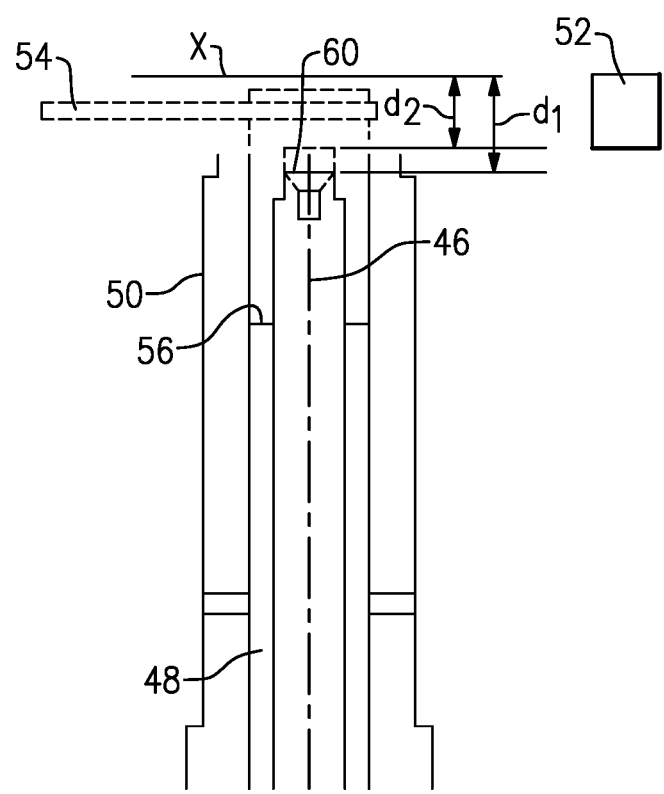
FIG. 2 shows a shaft having been stretched.

FIG. 2 shows the shaft 46 and wrench 54 tightening the nut 48. The shaft 46, nut 48 and shaft 50 are shown without the fixture 44 or ram 40. However, as is clear from FIGS. 2 and 1A, the wrench 54 is placed into an inner peripheral bore of the shaft 50 such that teeth at an end 56 engage teeth on the nut 48. After the wrench is placed into the bore the shaft puller 42 is then screwed to the shaft 46.

Shaft 46 is stretched towards baseline X for a distance d1 minus d2. The transducer 52 senses this amount of stretch. Transducer 52 communicates the amount of stretch back to the different controller 24.

The amount of stretch is utilized to determine if the material of the shaft is proper. As an example, a nominal range of a modulus of elasticity range of a given material is between $E_l$–$E_h$. It can be shown that:

$E_{measured}$=((input hydraulic pressure*Z)/area of the shaft 46)/(stretch dimension/original shaft 46 length).

Z is a hydraulic piston area of shaft puller 42.

Within the controller 24 the measured elongation is compared to see if it is within the range $E_l$–$E_h$. If not, the part fails, and the control then moves to a fail mode which begins to unload the pressure on the ram 40.

Returning to FIG. 1B, at step 51 the amount of stretch is measured by the transducer 52. The controller 24 receives the measured stretch. At step 49 the control compares a measured stretch to an acceptable range. If the measured stretch is outside the acceptable range then at step 47 a fail feedback is provided to the user interface 22. Alternatively, if the measured stretch is within the acceptable range, pass feedback is provided at step 45 to the user interface 22.

The control provides the feedback of the pass/fail to the user interface 22, such as on the visual display 19. If the part fails, then the pressure will be ramped down back toward zero. If the part passes, the operator is then instructed to tighten the nut.

The disclosed system thus tests material properties, and compares them to an acceptable range. The system also performs an automated stretch with precision. This is a closed loop system for pressure control.

Moreover, the lights 23, 27 and a kill switch 25 at the user interface 22 incorporate safety and notification features.

In one disclosed method, the control maintains a negative voltage at the valve to keep the valve closed. When an operator commands a pressure, the control is programmed to enter a closed loop pressure control. A ramp pressure increase through an S-curve is utilized where it starts slow, increases and then slows down as it approaches the commanded value in an attempt not to overshoot the desired pressure.

As pressurization or depressurization is occurring, light 23 will be triggered. The control is programed to then ramp the pressure to a preload condition. The preload condition is selected to increase the pressure ramp slowly. Once the preload condition is reached, the control is programmed to then ramp up the pressure to the defined commanded pressure through an increased rate until moving back to a slower rate as the commanded pressure is approached.

Once reached, the light 23 is turned off and light 27 will turn on. This informs the operator to conduct any operations. The operator will then tighten the nut 48 to lock the shaft 46 at the pre-stretch length.

There is also a user input switch 99 to inform the controller 24 that the operation(s) have been completed. Alternatively, the control is also programmed to have an expiration time (e.g., 500 seconds, 3 minutes, etc.) without a signal from switch 99. In either instance the controller 24 is programmed to bring the pressure back down to zero.

The light 27 is then turned off and the light 23 is turned on to indicate the pressure is ramping back downward. Once zero is reached, the light 23 is turned off. The lights then provide some signal that the program has been completed.

A worker of skill in this art will recognize controller 24 is programmed to perform all of what is disclosed herein.

Figure 3:
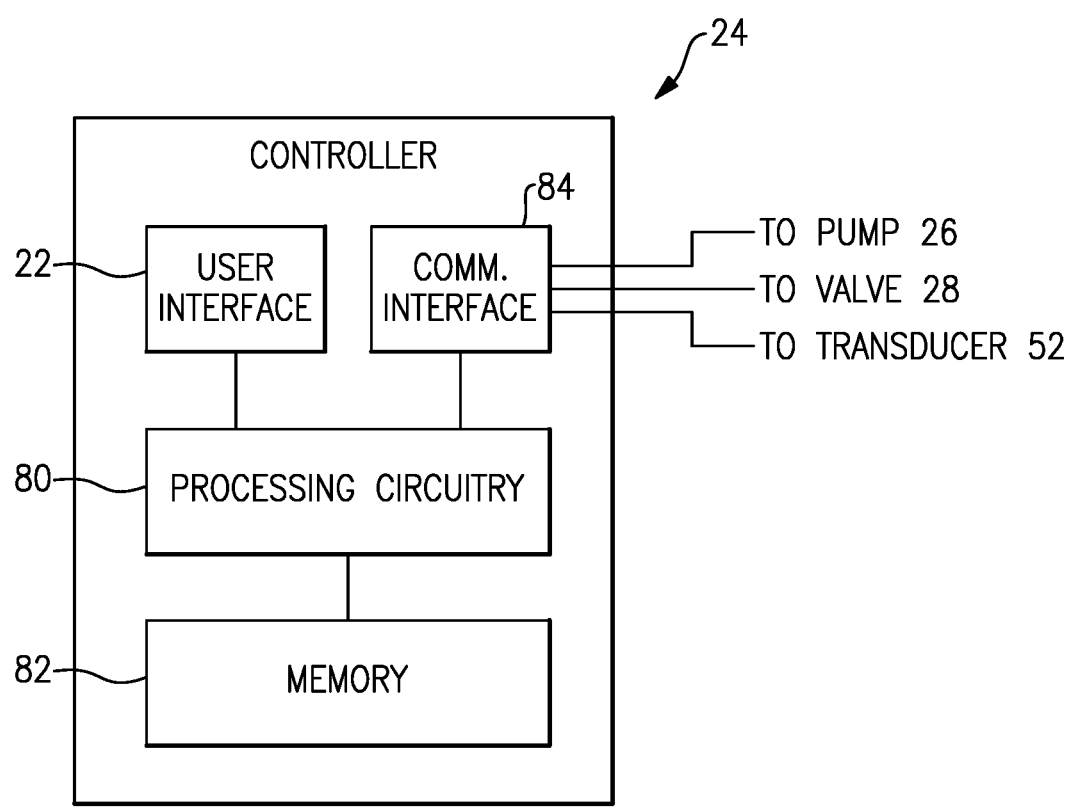
FIG. 3 schematically shows an example implementation of a controller of FIG. 1A.

FIG. 3 schematically shows an example implementation of the controller 24 of FIG. 1A. The controller 24 includes processing circuitry 80 operatively connected to memory 82 and a communication interface 84. The processing circuitry 80 may include one or more microprocessors, microcontrollers, application specific integrated circuits (ASICs), or the like. The memory 82 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 82 may incorporate electronic, magnetic, optical, and/or other types of storage media. The memory 82 stores instructions which, when executed by the processing circuitry 80, cause the processing circuitry to implement the various features discussed herein (e.g., the method of FIG. 1B).

The communication interface 84 is operable to facilitate communication between the controller 24 and other devices, such as pump 26, valve 28, and transducer 52.

The processing circuitry 80 communicates with the user interface 22 to obtain input from one or more users, and provide output data to the one or more users. Although the user interface 22 has been described above as a physical interface with lights 23 and 27 and switches 25 and 99, it is understood that these are non-limiting examples, and that software-based elements may be used as part of a GUI (e.g., a touchscreen-based controls in place of switches 25 and/or 99, and display areas in place of lights 23 and/or 27). In a GUI example, the visual display 19 (e.g., a liquid crystal display (LCD)) may operate as a display and a touchscreen.

Although the user interface 22 is depicted as being part of a same housing as the controller 24 in FIGS. 1 and 3, it is understood that this is a non-limiting example, and that the user interface 22 could still be a part of the controller 24 if situated in another housing (e.g., and connected through wiring to a controller housing).

A method of securing two components under this disclosure could be said to include receiving an input including a commanded pressure for achieving a pre-stretch on a shaft housed within a fixture. The shaft is coupled to a first component and extending through a second component. In response to receiving the input, causing hydraulic fluid to be provided to the fixture at a pressure based on the commanded pressure, to initiate the pre-stretch on the shaft. A measured stretch of the shaft is received from a sensor. Determining if the measured stretch is within a range of acceptable stretch; and based on a determination that the measured stretch is within the range of acceptable stretch, causing an indication of acceptability. The indication of acceptability being an instruction to tighten a nut to secure the shaft to the second component.

A system for securing a first component and shaft to a second component under this disclosure could be said to include a fixture for mounting the first component and the second component. A hydraulic pump is configured to pump hydraulic fluid through a valve. A controller includes a processing circuitry and a memory storing instructions that, when executed, cause the processing circuitry to receive, via a user interface, a commanded hydraulic pressure for stretching the shaft. The controller determines, based at least in part on the commanded hydraulic pressure, a pressurization schedule for stretching the shaft, wherein the pressurization schedule comprises a plurality of pressures of the hydraulic fluid that increase to the commanded hydraulic pressure. The processing circuitry causes the hydraulic pump and valve to operate such that the hydraulic fluid is pumped through the system based on the pressurization schedule.

A controller under this disclosure could be said to include a controller including a processor and a memory storing instructions that, when executed, cause the processor to receive, via a user interface, a commanded hydraulic pressure for stretching a shaft, and determine, based at least in part on the commanded hydraulic pressure, a pressurization schedule for stretching the shaft. The pressurization schedule comprises a plurality of pressures of the hydraulic fluid that increase to the commanded hydraulic pressure. The controller causes the hydraulic pump and valve to operate such that the hydraulic fluid is pumped through the system based on the pressurization schedule.

The disclosure here thus provides several benefits over the prior manual control of the hydraulic pump and valve. In particular a user is freed up to perform other operations, and the commanded pressure is achieved more accurately and efficiently. In addition, the controller is configured to determine whether the shaft is acceptable or a failed part.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:
1. A method of securing two components comprising:
  receiving an input comprising a predetermined commanded pressure for achieving a pre-stretch on a shaft housed within a fixture, coupled to a first component and extending through a second component;

in response to receiving the input, causing hydraulic fluid to be provided to the fixture at a pressure to achieve the predetermined commanded pressure, to initiate the pre-stretch on the shaft;

receiving, from a sensor, a measured stretch of the shaft;

determining if the measured stretch is within a range of acceptable stretch;

based on a determination that the measured stretch is within the range of acceptable stretch, causing an indication of acceptability to be displayed, the indication of acceptability being an instruction to tighten a nut to secure the shaft to the second component; and wherein the pressure comprises a pressurization schedule in which the pressure increases towards the commanded pressure initially at a first slow rate, then at an increased rate, then returned to a second slow rate as the commanded pressure is approached.

2. The method as set forth in claim 1, wherein at least a valve is controlled to achieve the pressure being sent to the fixture.

3. A method of securing two components comprising:

receiving an input comprising a commanded pressure for achieving a pre-stretch on a shaft housed within a fixture, coupled to a first component and extending through a second component;

in response to receiving the input, causing hydraulic fluid to be provided to the fixture at a pressure based on the commanded pressure, to initiate the pre-stretch on the shaft;

receiving, from a sensor, a measured stretch of the shaft;

determining if the measured stretch is within a range of acceptable stretch;

based on a determination that the measured stretch is within the range of acceptable stretch, causing an indication of acceptability to be displayed, the indication of acceptability being an instruction to tighten a nut to secure the shaft to the second component; and wherein the pressure comprises a pressurization schedule in which the pressure increases towards the commanded pressure initially at a first slow rate, then at an increased rate, then returned to a second slow rate as the commanded pressure is approached.

4. The method as set forth in claim 3, wherein a first indicator of a first light color is illuminated during pressurization when the pressure is less than the commanded pressure, and a second indicator of a second light color is illuminated at the commanded pressure.

5. The method as set forth in claim 1, wherein based on a determination that the measured stretch is not within the range of acceptable stretch, causing an indication that the part is not acceptable to be displayed.

6. The method as set forth in claim 1, wherein the one of the first component and the second component is a turbine rotor and the other is a compressor rotor.

7. The method as set forth in claim 1, wherein the measured stretch is determined and compared to the range of acceptable stretch based upon a modulus of elasticity of the shaft.

8. The method as set forth in claim 1, wherein the hydraulic fluid is supplied to a hydraulic ram in the fixture driving a shaft puller, which is also part of the fixture and which is secured to the shaft such that it stretches the shaft.

9. The method as set forth in claim 5, wherein when the determination is made that the measured stretch is not within the range of acceptable stretch, the pressure is relieved, without providing the indication to tighten the nut to secure the shaft to the second component.

* * * * *